Figure 1:
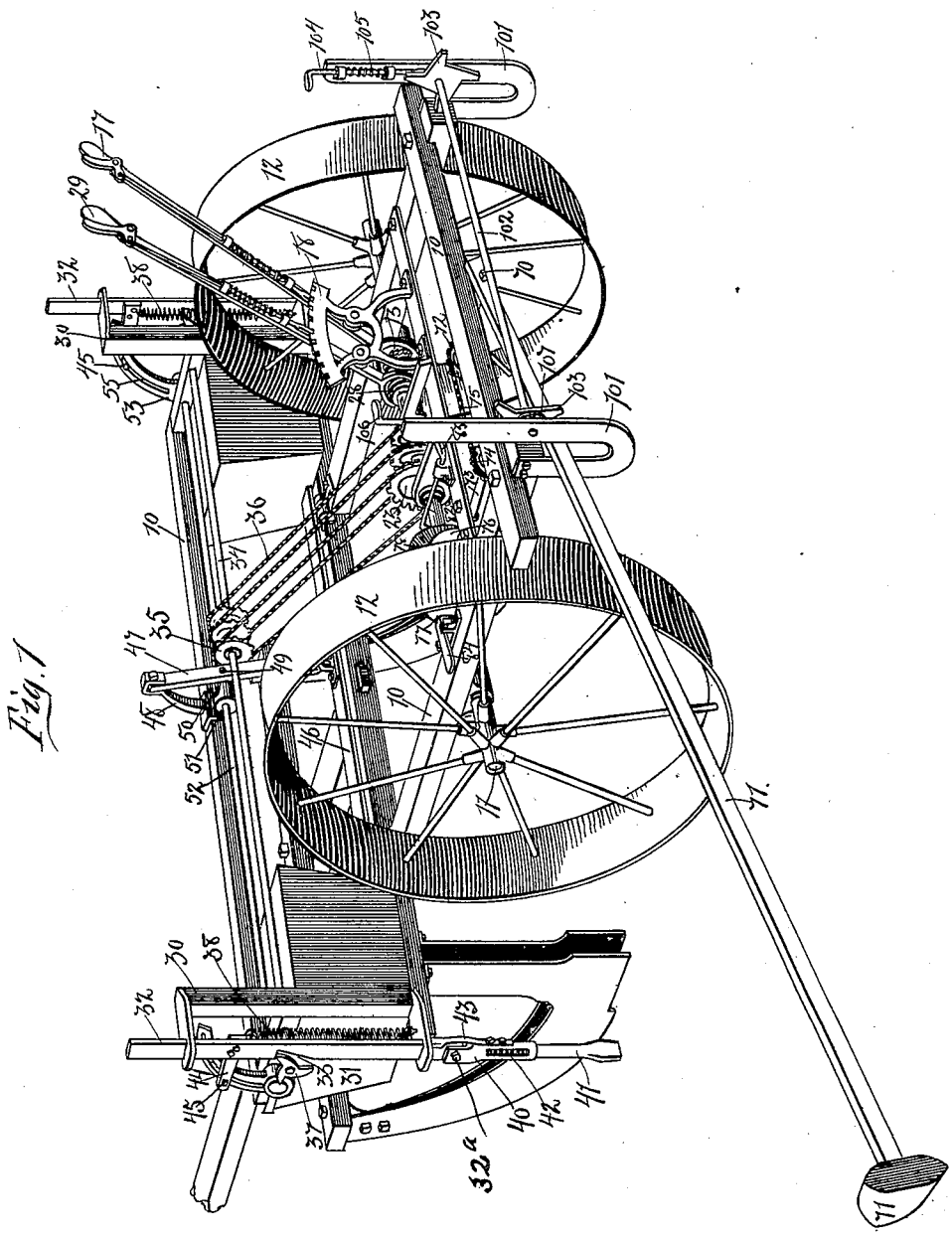

No. 650,476. Patented May 29, 1900.
J. McCORMICK.
CHECK ROW CORN PLANTER.
(Application filed Jan. 16, 1899.)

(No Model.) 4 Sheets—Sheet 1.

No. 650,476. Patented May 29, 1900.
J. McCORMICK.
CHECK ROW CORN PLANTER.
(Application filed Jan. 16, 1899.)
(No Model.) 4 Sheets—Sheet 2.
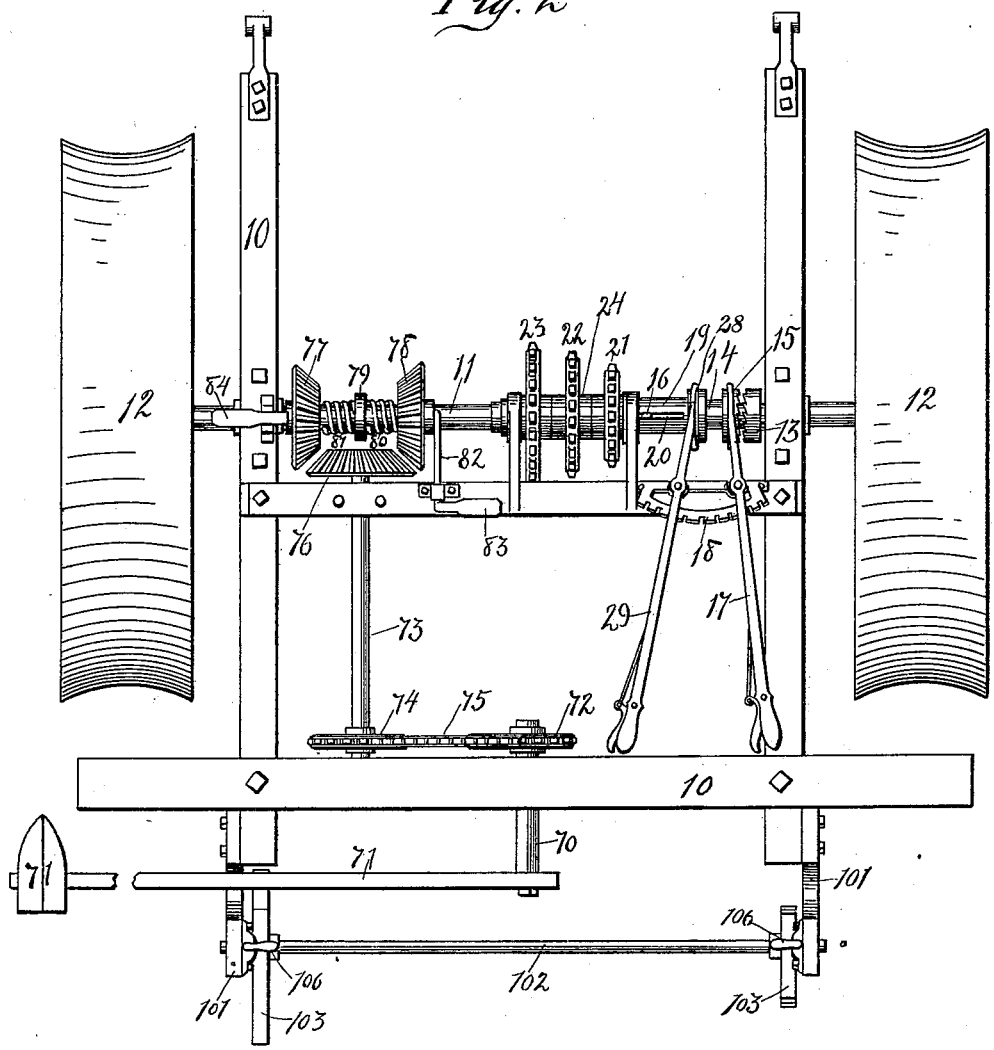

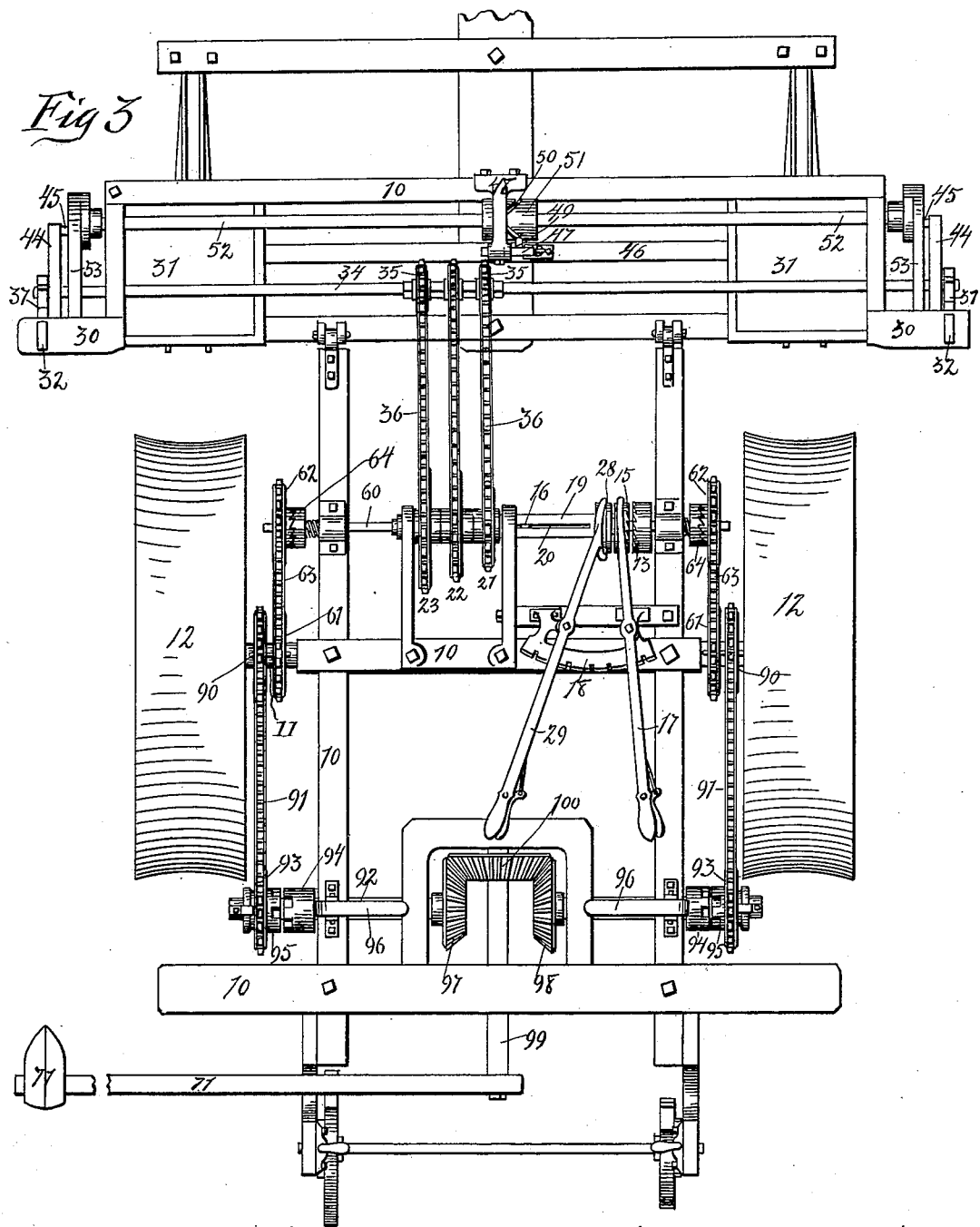

No. 650,476. Patented May 29, 1900.
J. McCORMICK.
CHECK ROW CORN PLANTER.
(Application filed Jan. 16, 1899.)
(No Model.) 4 Sheets—Sheet 4.
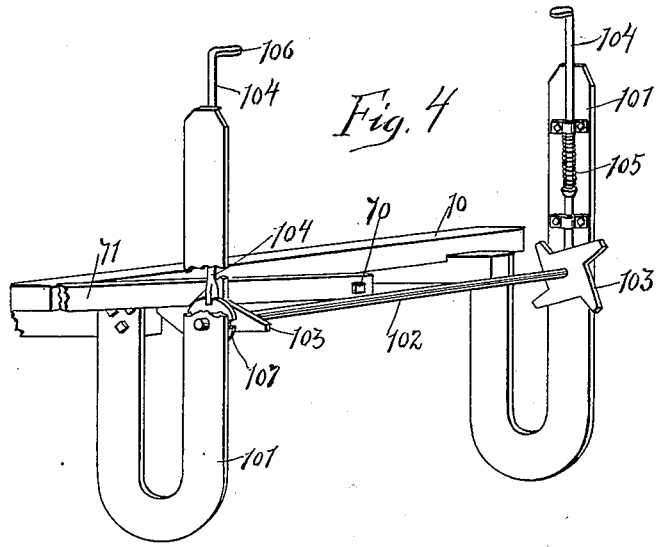
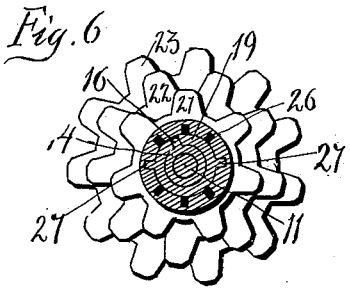
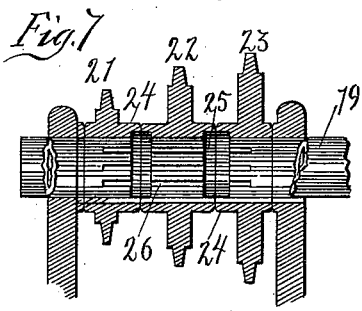
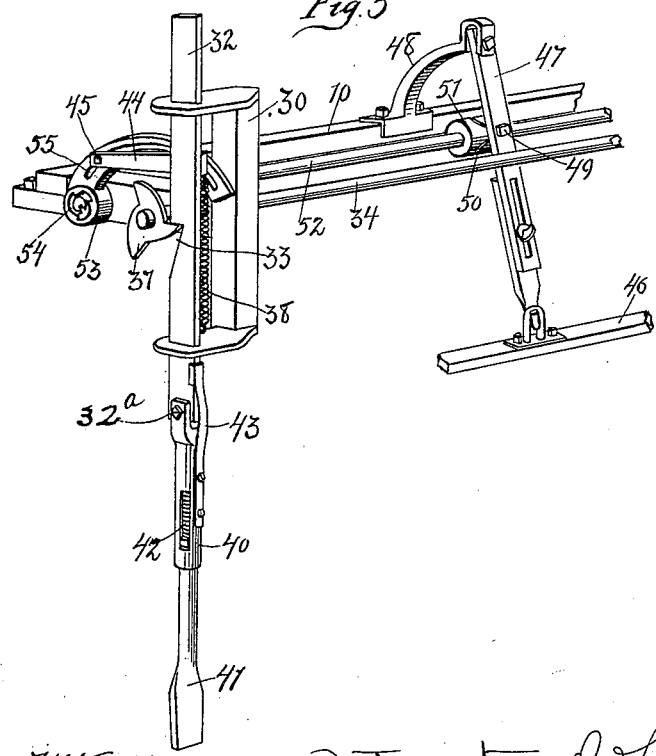
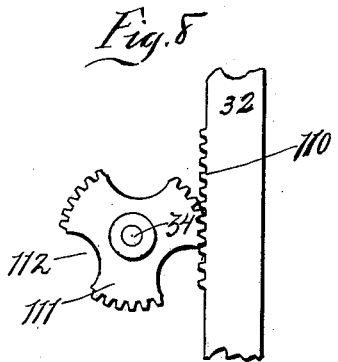
Witnesses
Geo. F. White
J. A. Bramhall
Inventor: John McCormick
By Thomas G. and J. Ralph Orwig,
Attorneys
THE NORRIS PETERS CO., PHOTO-LITHO., WASHINGTON, D. C.

UNITED STATES PATENT OFFICE.

JOHN McCORMICK, OF SPENCER, IOWA.

CHECK-ROW CORN-PLANTER.

SPECIFICATION forming part of Letters Patent No. 650,476, dated May 29, 1900.

Application filed January 16, 1899. Serial No. 702,356. (No model.)

*To all whom it may concern:*

Be it known that I, JOHN McCORMICK, a citizen of the United States, residing at Spencer, in the county of Clay and State of Iowa, have invented a new and useful Automatic Check-Row Corn-Planter, of which the following is a specification.

This invention relates to that class of corn-planters in which the corn is dropped in checked rows without the aid of a knotted wire stretched across the field, but in which the power for actuating the dropping mechanism is derived from the traction-wheels. Heretofore in planters of this class it has been found that owing to the irregular or uneven places on the ground-surface the hills of corn were not placed in checked rows even though the rows were started in alinement with each other.

My primary object in this invention is to provide simple, strong, and easily-operated means whereby the distances between the hills of corn dropped by the planter may be accurately, quickly, and readily changed by the operator, so that he may thereby drop the corn in exact alinement with the hills previously dropped even though the planter is passing over uneven and irregular ground-surfaces.

A further object is to provide an automatically-operating device of simple, strong, and durable construction for forming indentations in the ground-surface at the sides of the hills of corn. Heretofore hill-markers of this class have generally been operated by gravity and released when the corn was dropped; but owing to the irregular movements of the planter the marker would not in practical use accurately designate the hills. My object is to force the said markers by strong pressure into the ground, so that the hills of corn will be accurately designated, and at the same time deep marks that may be easily seen will be made in the ground.

A further object is to provide a device of simple, strong, and durable construction for operating the corn-dropping mechanism by and in unison with the operation of the marker, to thereby make an exact registration of the hills of corn and the marks previously made upon the ground even though the distance between the hills of corn has been changed or adjusted.

A further object is to provide simple, strong, durable, and easily-actuated means for holding the row-marker out of contact with the ground, as when turning corners, &c., and for throwing it from one side to the other automatically when desired.

My invention consists in certain details in the construction, arrangement, and combination of the various parts of the device, as hereinafter set forth, pointed out in my claims, and illustrated in the accompanying drawings, in which—

Figure 1 shows the complete device in perspective. Fig. 2 shows a top or plan view of the rear or wheel frame of the planter. Fig. 3 shows a plan view of a modified form. Fig. 4 shows a detail perspective view illustrating the device for supporting the row-marker. Fig. 5 shows a detail perspective view illustrating one of the hill-markers and also the means connected therewith for actuating the corn-dropper. Fig. 6 shows a transverse sectional view of the device for transmitting motion to the hill-marker, taken through the shaft of the traction-wheels looking toward the smallest of the sprocket-wheels. Fig. 7 shows a longitudinal sectional view of the device shown in Fig. 6. Fig. 8 shows a detail side view of the modified form of device for raising the hill-marker.

In the following description I shall specifically describe and refer to by reference-symbols only such parts as are my own invention or necessary to an understanding of the parts that I have invented.

The reference-numeral 10 is used to indicate the wheel portion of the frame of the machine.

11 indicates the axle of the traction-wheels, and 12 the traction-wheels.

In this planter motion is transmitted from the axle of the traction-wheel to the shaft which operates indirectly the hill-marker and the corn-dropping mechanism. I have provided means whereby this shaft may be rotated at different speeds relative to the rotation of the axle, as follows:

The reference-numeral 13 indicates a ratchet-faced clutch fixed to the driving-axle.

14 indicates a sleeve slidingly and rotatably mounted upon said axle and having a ratchet-faced clutch 15 fixed thereto and also a key or lug 16 projecting outwardly from the sleeve.

The numeral 17 indicates a lever fulcrumed to a suitable support and connected with the sliding ratchet-faced clutch 15 and having a spring-actuated pawl designed to engage a segmental ratchet 18, fixed to the machine-frame. By this arrangement the sleeve 14 may be made to rotate in unison with the axle 11 or be held stationary, as desired.

The reference-numeral 19 indicates a sleeve slidingly mounted upon the sleeve 14 and having a longitudinal slot 20 therein through which the lug or key 16 may project. Rotatably mounted upon this sleeve 19 is a series of sprocket-wheels 21, 22, and 23, having hubs 24 to project outwardly therefrom, as required, to leave annular spaces 25 between the sprocket-wheels. On the interior of each spocket-wheel I have formed one or more angular notches 26, designed to receive the lugs 27, one or more of which project outwardly from the outer surface of the sleeve 19. On one end of this sleeve 19 is an annular grooved collar 28, and 29 indicates a lever fulcrumed to a part of the machine-frame and having its bifurcated end placed in said annular groove. This lever is also provided with a spring-actuated pawl arranged to engage the aforesaid segmental ratchet 18. It is obvious that by a movement of said lever 29 the sleeve 19 may be moved longitudinally upon the sleeve 14, and the lugs 27 may be made to engage the notches 26 in either one of the wheels 21, 22, and 23 or may be made to enter the annular space 25 between the said wheels. Thus any one of said wheels may be thrown into operation, or the operation of the entire device may be stopped by placing the lugs 27 in the annular spaces 25.

At the forward end of the machine and on the runner-frame is a frame 30, fixed to each of the hoppers 31 to slidingly support a bar 32. This bar has a notch 33 in its forward edge to provide means whereby the bar 32 may be elevated. 34 indicates a shaft rotatably mounted in the frame 30 to extend transversely of the machine above the hoppers. On this shaft I have fixed sprocket-wheels 35 to correspond in number with the sprocket-wheels on the sleeve 19. These sprockets 35 are all of the same size and are connected with the aforesaid sprocket-wheels by means of the chains 36. It is obvious that the shaft 34 may be made to rotate at different speeds relative to the axle 11 by throwing different ones of the sprockets on the sleeve 19 into position to drive the shaft 34. On each end of the shaft 34 is a three-armed cam 37, designed to engage the notch 33 in the bar 32. 38 indicates an extensile spring attached at one end to the bar 32 and at its other end to the lower end portion of the frame 30 to normally pull downwardly on the bar 32. Attached to the lower end of the aforesaid bar 32 is a hill-marker constructed as follows: The reference-numeral 40 indicates a sleeve having its upper end pivoted to the lower end of the bar 32, as at $32^a$, to be capable of a movement in the direction of the line of advance of the planter. 41 indicates a sharpened rod slidingly mounted in the tube 40. 42 indicates a spring within the tube 40 to normally press downwardly on the rod 41, and 43 indicates a spring fixed to the sleeve 40 with its upper end in engagement with the bar 32 to thereby hold the lower end of the rod 41 to its forward limit and yet permit said rod 41 to swing backwardly a slight distance. These springs 42 and 43 are provided for the purpose of allowing a limited flexion of the rod 41, so that in case it should strike a stone or other obstruction it will slide off to one side of it. At the upper end of the bar 32 is an arm 44, having a roller 45 thereon, the purpose of which will be explained hereinafter. I have provided means for actuating the corn-dropping mechanism in unison with the said hill-marker as follows:

The reference-numeral 46 indicates a slide having its ends mounted in the hoppers, where they connect with the usual means for dropping corn into the heel of the runner. This means will not be shown or described in detail, because it forms no part of my present invention and because such means are in common use.

The reference-numeral 47 indicates a lever pivoted to the support 48. Its lower end is pivoted to the slide 46, and on its central portion is an arm 49, which rests in a cam-groove 50, formed in the block 51, which is secured to a shaft 52. This shaft is rotatably mounted in the frame 30. On the end of this shaft 52 I have mounted a segmental arm 53, having a ratchet device 54 on its interior to connect the shaft 52. By this arrangement the said shaft 52 is rotated only during the downward movement of the arm 53. 55 indicates a slot in the arm 53, into which slot the roller 45 is inserted. Hence when the bar 32 is elevated the shaft 52 will be rotated, and through the lever 47 and the bar 46 the corn-dropping mechanism will be actuated.

From the foregoing description it will be noted that the hill-marking device may be made to move at any desirable rate of speed relative to the speed of rotation of the axle of the driving-wheels, and, further, that the corn-dropping mechanism will be actuated at the same time as the hill-marking mechanism, and, further, that when the speed of the hill-marking mechanism is changed—that is, when it is made to mark on the ground at different distances—the corn-dropping mechanism will be actuated at the same point. The hill-marking mechanism and the corn-dropping mechanism are the same on each side of the machine. Hence I have only described the construction and operation of the mechanisms on one side. In the modification of this part of the machine shown in Fig. 3 the only difference consists in supplying an auxiliary shaft 60, rotatably mounted on the machine-frame in advance of the axle of the traction-wheels and having fixed thereto or mounted thereon the devices previously described as being fixed to the axle.

61 indicates a sprocket fixed to the axle 11 and connected to a sprocket 62, which is placed on the shaft 60 by means of the sprocket-chain 63.

64 indicates a spring-actuated clutch device whereby said sprocket 62 may be thrown out of engagement with the shaft 60. A similar driving device is placed on each end of the shaft 60. In operation these two forms are substantially the same.

The devices for reversing the row-marker from one side of the machine to the other comprise a shaft 70, rotatably mounted in the machine-frame and having fixed to its rear end the marker 71. On the forward end of the shaft 70 is a sprocket-wheel 72.

73 indicates a shaft rotatably mounted on the machine-frame and having on its rear end a sprocket 74, connected with the sprocket 72 by means of a chain 75. On its forward end is a bevel gear-wheel 76. On the axle 11 I have rotatably mounted two bevel gear-wheels 77 and 78, either of which may be thrown into mesh with the gear 76.

79 indicates a collar fixed to the shaft 11 between the bevel-gears 77 and 78, and the numeral 80 indicates a spring coiled upon the shaft 11 to engage the collar 79 and also the gear-wheel 78 to normally hold it out of engagement with the gear-wheel 76. 81 indicates a like spring to normally hold the other gear-wheel 77 out of engagement with the gear 76.

82 indicates a lever fulcrumed to the machine, having a treadle 83 formed on one end, and having its other end designed to engage the outer surface of the wheel 78 to provide means whereby the wheel 78 may be thrown into engagement with the wheel 76 when said treadle is depressed, and the numeral 84 indicates a treadle arranged to throw the wheel 77 into engagement with the wheel 76. Assuming this device to be in the position shown in Fig. 2, it is obvious that in order to turn the row-marker from the position in which it is shown to the opposite side of the machine the treadle 84 must be depressed as required to throw the gear-wheel 77 into engagement with the gear 76 and the gear 78 out of engagement therewith. Then as the machine is advanced the shaft 70 will be rotated as required to turn the marker 71, until this movement is stopped by releasing the treadle 84, whereupon the gear 77 will be thrown out of engagement with the wheel 76. In the modified form of this part of the device shown in Fig. 3 I have substituted the following mechanism:

The reference-numeral 90 indicates a sprocket-wheel fixed to the axle 11 and having a chain 91 connected therewith.

92 indicates a shaft mounted in the machine-frame in the rear of the axle and having a sprocket-wheel 93 rotatably mounted thereon and engaged by the chain 91. On the inner face of the sprocket-wheel 93 is a clutch composed of two members 94 and 95. The member 95 is attached to the sprocket-wheel 93, and the member 94 is slidingly mounted on the shaft 92. A lever 96 is provided, whereby the clutch member 94 may be moved into or out of engagement with the member 95. A bevel gear-wheel 97 is fixed to the inner end of the shaft 92. A similar bevel gear-wheel 98 is fixed to a similar shaft on the opposite side of the machine provided with the same means for driving it and for throwing it in or out of operation.

99 indicates a shaft rotatably mounted in the machine-frame and having a bevel gear-wheel 100 fixed to its forward end to mesh with the gears 97 and 98. On the rear end of this shaft 99 is fixed a marker 71. In practical use by operating either one of the levers 96 the corresponding gear-wheel with which it is connected will be made to rotate the gear-wheel 100, which obviously will operate the marker.

I have provided means for holding the pivoted row-marker in an elevated position for convenience in turning corners, &c. This device comprises a U-shaped frame 101, fixed to the rear end of the wheel-frame and arranged to admit the marker 71 to enter between the sides of the frame 101.

102 indicates a shaft rotatably mounted in the frame 101 in the rear of the marker, having on its end a notched wheel 107 and also an armed wheel 103, having a number of arms to project outwardly therefrom far enough to support the marker 71 when in a horizontal position and so arranged as to permit the marker to drop when the shaft 102 is rotated or released.

104 indicates a rod slidingly mounted on the rear portion of the frame 101, and 105 indicates a spring mounted on said rod to normally hold it to its downward limit and in engagement with the notched wheel 107. A handle 106 at its top provides means whereby the rod may be elevated.

Assuming the device to be in the position shown in Fig. 4—that is, with the marker 71 resting upon one of the arms of the armed wheel 103—and assuming, further, that it is desired to release the marker, I elevate the rod 104 and immediately release it. This operation will permit the armed wheel 103 to rotate a sufficient distance to allow the marker to drop, and the said rod will again enter the next notch in the wheel 107 to thereby hold the arms on the armed wheel 103 in such a position that the marker 71 may be raised and lowered without engaging them. The armed wheel 103, which is located on the opposite side of the shaft 102, has its arms arranged in a different manner from the arms on the armed wheel just described. By this arrangement it is obvious that when the armed wheel 103 on one side is in a position to support the marker 71 in an elevated position the armed wheel 103 on the opposite side is in a position to allow the marker 71 to be raised.

In the modification shown in Fig. 8 I have illustrated a device to be substituted for the parts 32 and 37, previously described. In this modification I have placed a rack 110 on the front edge of the bar 32, and in place of the device 37 I have provided a pinion 111, having parts removed at 112. As the pinion 111 is rotated it will engage the rack 110 and elevate it until the part 112 reaches a position adjacent to the rack, whereupon the rack will fall by gravity and be again raised upon a further rotation of the pinion. This arrangement of parts insures the elevation of the bar 32 to exactly the same height upon each operation.

Having thus described the construction, arrangement, and function of each separate part of the device in its turn, it is believed that the operation of the machine as a whole will be readily understood, inasmuch as the parts perform the same function as in the ordinary planter.

What I claim as my invention is—

1. In a corn-planter, the combination of a shaft rotatably mounted, a seed-dropping slide, mechanism for actuating the seed-dropping slide upon a rotation of said shaft, two or more sprocket-wheels of the same diameter fixed to the shaft, a second shaft rotatably mounted, means for driving it during the advance of the machine, a corresponding number of sprocket-wheels of graduated sizes on the second shaft, each having one or more notches in its central portion, chains for connecting the sprocket-wheels, a device slidingly but not rotatably mounted on the latter shaft, a lug or key thereon designed to enter one of the notches in either of the said wheels, and means for sliding the said device on the shaft so that any one of the sprockets may be driven with the shaft, for the purposes stated.

2. In a corn-planter, the combination of a seed-dropping slide, a shaft adjacent thereto, a grooved cam on the shaft, means for operating the slide from the grooved cam, a shaft adjacent thereto rotatably mounted, means for connecting these shafts whereby the first is rocked as required to move the seed-dropping slide upon each revolution of the second shaft, a series of sprocket-wheels fixed on the second shaft of the same size, a third shaft rotatably mounted, means for driving it during the advance of the machine, a series of sprocket-wheels of graduated sizes on the third shaft each having one or more notches near its central opening, chains for connecting the sprocket-wheels, a sleeve loosely mounted on the third shaft, a lug on the said sleeve, a second sleeve on the first passing through said sprockets, and having a slot therein through which the said lug is passed, and one or more lugs on the latter sleeve designed to enter the notches in the said sprockets, and means for moving said latter sleeve longitudinally to engage the sprockets successively, for the purposes stated.

3. In a corn-planter, a hill-marker and corn-dropper, comprising a shaft rotatably mounted, a device on its end having two or more arms, a bar slidingly mounted in a vertical plane adjacent thereto, and having a notch or its equivalent therein designed to be engaged by the said arms, a spring for drawing said bar downwardly so that its lower end will mark the ground, a second shaft rotatably mounted, an arm on the end of the shaft, a ratchet device on the interior of a ratchet device connecting the arm and shaft, an arm on the said bar connected with the arm on the said shaft, a cylindrical block on the said latter shaft, having a cam-groove therein, a lever pivoted to a fixed support, a roller on said lever to enter said cam-groove, a bar pivoted to the lower end of said lever, and slidingly mounted, and designed to actuate the corn-dropping mechanism of a planter, substantially as and for the purposes stated.

4. In a corn-planter, a device for holding the row-marker in an elevated position, comprising two approximately U-shaped frames fixed to the rear-end portion of the planter-frame, a shaft rotatably mounted therein, a wheel on each end of the said shaft, each having two or more arms thereon, with the arms on one end placed in a staggered position relative to those on the other end, a notched wheel on each end of said shaft, a rod slidingly mounted in a U-shaped frame on each side of the device, with its lower end designed to enter the notches in said notched wheel, and a spring for normally holding each rod downwardly.

5. In a corn-planter, a row-marker, comprising a shaft rotatably mounted, a marker proper fixed to its rear end, a second shaft rotatably mounted on the machine-frame, means for connecting them, a bevel-gear on the forward end of said shaft, two bevel-gears slidingly mounted on the axle of the driving-wheel, springs coiled upon said shaft to normally hold the said bevel-gears out of engagement with the aforesaid bevel-gear, means for throwing either one of the bevel-gears on the axle into engagement with the bevel-gear on the shaft, and a device substantially as shown and described for automatically supporting the row-marker in a position near the ground, and means for releasing it, all arranged and combined substantially as in the manner set forth and for the purposes stated.

JOHN McCORMICK.

Witnesses:
R. B. JONES,
J. E. JAMES.